US007686534B2

United States Patent
Kurth et al.

(10) Patent No.: US 7,686,534 B2
(45) Date of Patent: Mar. 30, 2010

(54) DEVICE FOR FASTENING AT LEAST ONE ELONGATED OBJECT TO A BASE

(75) Inventors: Martin Kurth, Rhein-Ötlingen (DE); Günter Tremmel, Schwörstadt (DE)

(73) Assignee: A. Raymond & Cie, Grenoble (FR)

( * ) Notice: Subject to any disclaimer, the term of this patent is extended or adjusted under 35 U.S.C. 154(b) by 133 days.

(21) Appl. No.: 10/554,079

(22) PCT Filed: Aug. 19, 2004

(86) PCT No.: PCT/EP2004/009291

§ 371 (c)(1),
(2), (4) Date: Oct. 21, 2005

(87) PCT Pub. No.: WO2005/036041

PCT Pub. Date: Apr. 21, 2005

(65) Prior Publication Data

US 2006/0228171 A1    Oct. 12, 2006

(30) Foreign Application Priority Data

Sep. 16, 2003 (DE) ................................ 103 42 729

(51) Int. Cl.
*F16B 21/00* (2006.01)
(52) U.S. Cl. ................ 403/329; 403/DIG. 14
(58) Field of Classification Search ............. 403/292, 403/329, DIG. 11, DIG. 14; 411/508–510; 24/289, 292, 293, 297
See application file for complete search history.

(56) References Cited

U.S. PATENT DOCUMENTS

| 4,304,148 | A | * | 12/1981 | Hamman | .............. | 74/502.4 |
| 4,865,505 | A | * | 9/1989 | Okada | .............. | 411/508 |
| 5,040,752 | A | | 8/1991 | Morrison | | |
| 6,194,661 | B1 | * | 2/2001 | Gretz | .............. | 174/153 R |
| 6,264,393 | B1 | * | 7/2001 | Kraus | .............. | 403/282 |

FOREIGN PATENT DOCUMENTS

| DE | 8513784 U | 6/1985 |
| EP | 0967702 | 12/1999 |
| GB | 2154648 A | 9/1985 |
| GB | 2243399 A | 10/1997 |

* cited by examiner

*Primary Examiner*—Victor MacArthur
(74) *Attorney, Agent, or Firm*—Tarolli, Sundheim, Covell & Tummino LLP

(57) ABSTRACT

A device for fastening cable is provided, the device including a base having a carrier part for holding the cable. A first connecting unit includes a sleeve connected to the carrier part, and the device further includes a second connecting unit comprising a guide part connected to the carrier part and a holding part releasably engageable with the guide part. The guide part includes an outer sleeve that defines a guide cavity for receiving the holding part. The guide cavity has a cross section that is longer in the longitudinal direction than in the transverse direction. The holding part includes an inner sleeve having a smaller diameter than the diameter of the outer sleeve. The inner sleeve includes at least one engagement element that engages at least one engagement element on the outer sleeve to fasten the cable to the carrier part.

9 Claims, 4 Drawing Sheets

DEVICE FOR FASTENING AT LEAST ONE ELONGATED OBJECT TO A BASE

CROSS-REFERENCE TO RELATED APPLICATION

This application claims the benefit of International Application No. PCT/EP2004/009291, entitled "DEVICE FOR FASTENING AT LEAST ONE ELONGATED OBJECT TO A BASE PART", filed Aug. 19, 2004, which claims priority to German Patent Application No. DE 10342729.5, filed Sep. 16, 2003.

TECHNICAL FIELD

The present invention relates to a fastening device and more specifically, to a device for fastening cable to a carrier element.

BACKGROUND OF THE INVENTION

The invention pertains to a device for fastening at least one elongated object to a base part by means of at least two fastening elements connected to the base part, having a carrier part for holding the object or each object, having a connecting unit which has a fixed guide part that is connected with the carrier part, and a holding part that is in displaceable engagement with the guide part and that can be brought into engagement with a fastening element, and having a further connecting unit that can be brought into engagement with a further fastening element.

A device of this type is known from DE 85 13 784 U. In the previously known device, elongated objects in the form of conducting wires can be fastened by means of strips to an elongated rail as the carrier part. The previously known device has a first connecting unit, which exhibits a fixed guide part connected with the carrier part. The guide part of the previously known device exhibits a pin configured with a head. The head, which is larger in diameter than the cross section of a shaft segment of the pin, is grasped from behind by an elongated rail that is connected with a holding part for a fastening element. The rail is guided by the pin, so the holding part can be displaced relative to the guide part.

Although the previously known device is easy to fasten, and the displaceability of the holding part makes it possible to correct distance discrepancies between the fastening elements, the design of the connecting element in question is relatively bulky, and it is relatively expensive to produce.

The invention is based on the problem of suggesting a device of the type mentioned above that has a relatively compact design and is inexpensive to produce.

According to the invention, this problem is solved by a device of the type mentioned above, in that the guide part is configured with an outer sleeve that surrounds a guide cavity, whereby the guide cavity exhibits a cross section that is longer in the longitudinal direction than in the transverse direction, that the holding part has inside the guide cavity a displaceable inner sleeve with a diameter in the longitudinal direction that is smaller than the diameter of the outer sleeve in the longitudinal direction, and that engagement elements that are in engagement with each other are configured between the walls of the guide part and the walls of the holding part.

Because of the design of the device according to the invention, the holding part is placed in a space-saving way inside the guide part, and is guided directly over the guide part by the engagement elements inside the guide cavity. As a result, the device can be used even under cramped installation conditions, and can be produced inexpensively. In one configuration of a device according to the invention, it is advantageously provided that the engagement elements are formed by guide recesses and guide projections that extend in the longitudinal direction.

In order to achieve an insertion of the holding part into the guide part that is as easy as possible, in a further development of the configuration mentioned above, it is provided that the guide projections are configured on walls of the guide part and the guide recesses are configured on walls of the holding part.

In order to prevent as much as possible the holding part from being pulled out of the guide part, the guide projections in the configuration mentioned above and the associated further development advantageously exhibit a triangular cross section, whereby the side facing the fastening element in the mounting direction onto a fastening element is angled less steeply than the side facing away from the fastening element in the mounting direction.

In order to achieve a good connection with a fastening element with a device according to the invention, in an advantageous configuration the holding part surrounds a continuous holding channel and is configured with inward pointing latching lugs.

In another advantageous configuration of a device according to the invention, for an especially good distance adjustment it is provided that the additional connecting unit is configured in accordance with the connecting unit that exhibits a displaceable holding part, whereby the longitudinal directions of the holding parts are aligned at right angles to each other. As a result, this configuration can be especially well adjusted.

Further advantageous configurations and advantages of the invention are the object of the following description of an embodiment, including references to the figures in the drawing. The following are shown:

SUMMARY OF THE INVENTION

A device for fastening cable to a base is provided, the device including a carrier part for holding the cable. A first connecting unit includes a sleeve connected to the carrier part, and the device further includes a second connecting unit comprising a guide part connected to the carrierpart and a holding part releasably engageable with the guide part for connecting the carrier part to the base. The guide part includes an outer sleeve that defines a guide cavity for receiving the holding part. The guide cavity has a cross section that is longer in the longitudinal direction than in the transverse direction. The holding part includes an inner sleeve having a smaller diameter than the diameter of the outer sleeve. The inner sleeve includes at least one engagement element that engages at least one engagement element on the outer sleeve to fasten the cable to the carrier part.

BRIEF DESCRIPTION OF THE DRAWINGS

FIG. 1 shows a three-dimensional view of an embodiment of a device 100 according to the invention made of plastic and having a carrier part that is configured as an elongated cable channel 1. The cable channel 1 exhibits, for an elongated object to be fastened to a base part not shown in FIG. 1, two opposing side walls 2, 3 and a bottom wall 4 that is connected with the side walls 2, 3. The region of the cable channel 1 that is opposite the bottom wall 4 is made open so that the object to be fastened, e.g., a cable, a cable bundle with several cables, a tube or a tube bundle with several tubes, can be inserted between the side walls 2, 3. In a conventional arrangement of the cable channel 1 on a base part, the open side of the cable channel 1 faces the base part and is essentially covered by it.

Figure 1:
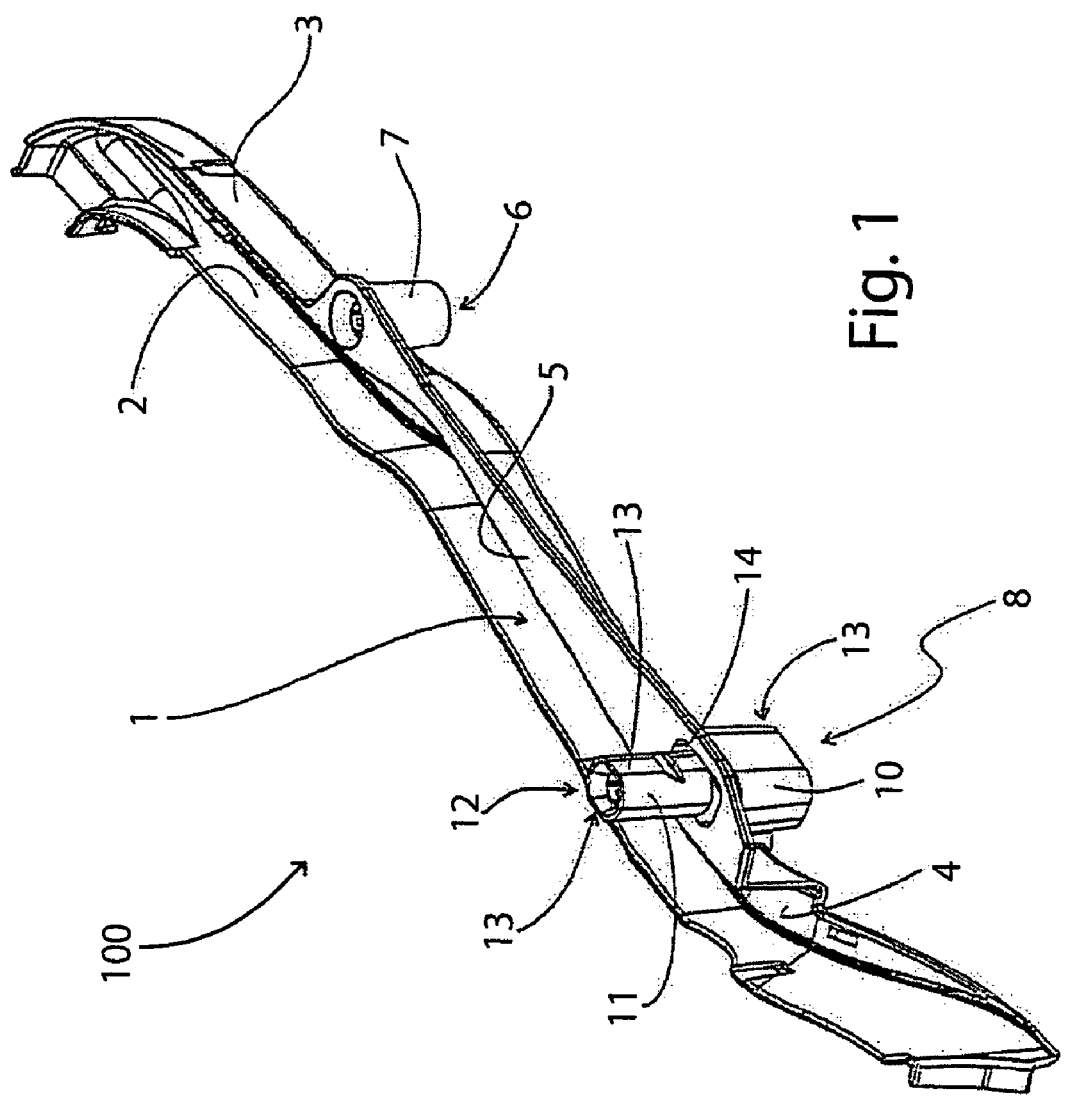
FIG. 1 a three-dimensional view of an embodiment of the invention with a connecting unit that exhibits a displaceable guide part and a further fixed connecting unit, FIG. 2 a three-dimensional view, enlarged with respect to FIG. 1, of the connecting unit that exhibits the displaceable guide part, FIG. 3 a longitudinal cross section of the connecting unit according to FIG. 2, and FIG. 4 a transverse cross section of the connecting unit according to FIG. 2.

Configured on the side wall 3 facing the observer, on the edge side facing away from the bottom wall 4 in the representation of FIG. 1, is a web 5, which is aligned approximately at a right angle to the side wall 3 and which projects out from same in the outward direction. The web 5 extends over a certain length of the cable channel 1, for example, over about two thirds of the length of an essentially straight section.

Present at a first end region of the web 5 is a first connecting unit 6, which is configured as a stationary fixed sleeve 7 that extends in the direction of the bottom wall 4 essentially parallel to the side wall 3 and terminates with the bottom wall 4. The fixed sleeve 7 exhibits a roundish cross section and can be slipped onto a fastening element that is connected with the base part, typically made as a threaded bolt welded to the base part.

In addition, a second connecting unit 8 is present at the other end region of the web 5. The second connecting unit 8 exhibits a guide part 9, which is connected with the web 5 and which is configured with an outer sleeve 10. The second connecting unit 8 is additionally equipped with a holding part 12, which exhibits an inner sleeve 11 and which in the representation in FIG. 1, immediately after the production of the device according to the invention is connected, still projecting over the web 5, with the outer sleeve 10 by means of a connecting burr. The outer wall of the inner sleeve 11 is configured with flat sections 13, which are opposite each other and into each of which at least one engagement element, such as a guide recess 14 is made.

To receive the intended arrangement of the second holding part 8 that is required for the fastening to the base part, the inner sleeve 11 is inserted with a special tool into the outer sleeve 10 while destroying the connecting burr.

Figure 2:
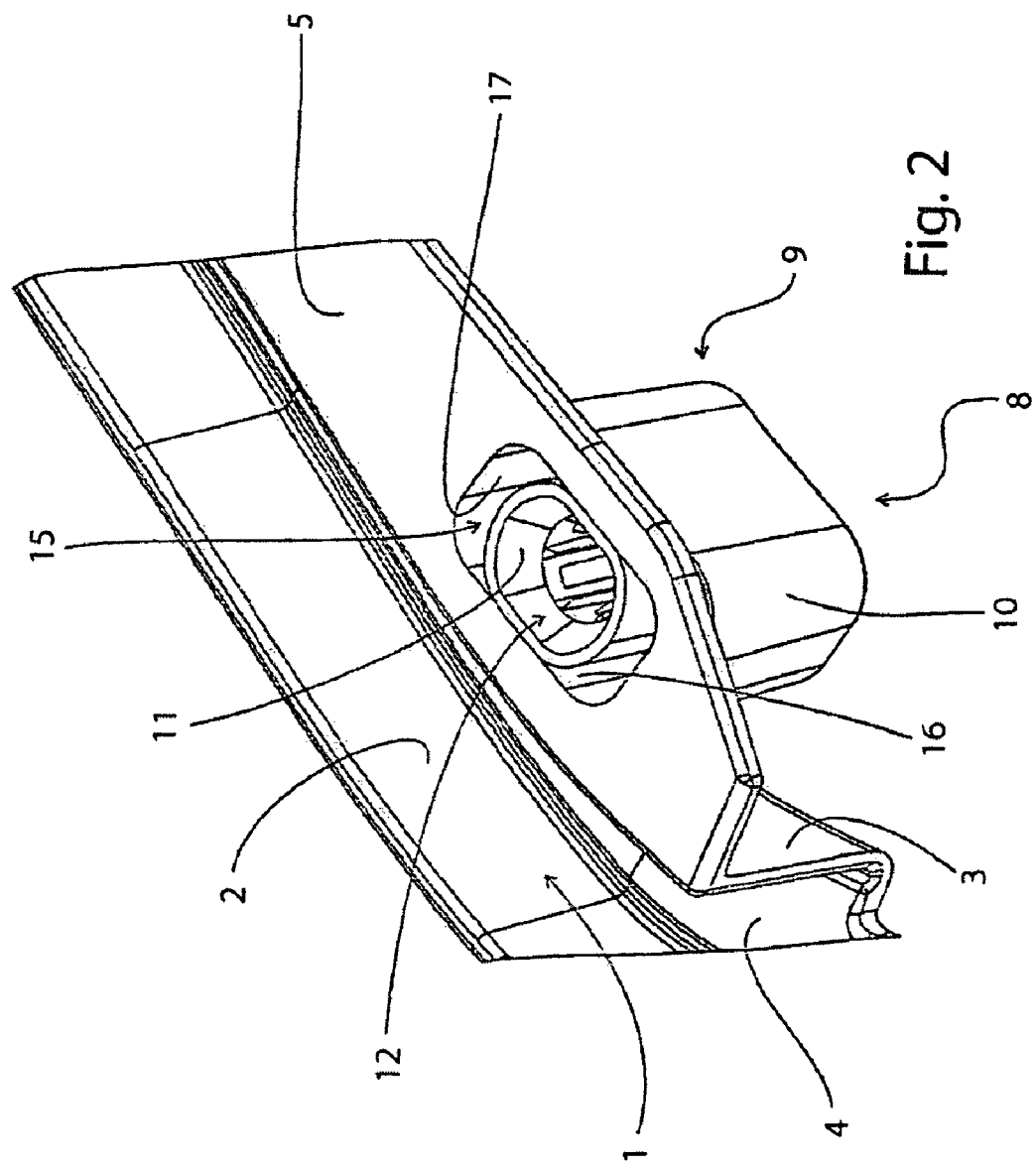

FIG. 2 shows, in a three-dimensional view that is enlarged with respect to FIG. 1, the second connecting unit 8, which exhibits the displaceable guide part 8 [sic] with the inner sleeve 11 that is now inserted into the outer sleeve 10. It can be seen in FIG. 2 that a guide cavity 15 of the outer sleeve 10 exhibits a cross section that is greater in a longitudinal direction which, in the embodiment shown, approximately follows the extension of the web 5, than in the transverse direction aligned at a right angle thereto. In the embodiment according to FIG. 2, the cross section is configured approximately rectangular with relatively strongly rounded corner regions.

It can also be seen in FIG. 2, that the inner sleeve 11 lies with the flat sections 13 configured on its outer wall against likewise flat longitudinal sections 16 of the inner wall of the outer sleeve 10 so that the inner sleeve 11 can be guided relative to the outer sleeve 10 in the longitudinal direction of the guide recess 14 through the longitudinal sections 16 between the transverse sections 17, which lie in the transverse direction of the guide cavity 15 and which serve as edge stops.

Figure 3:
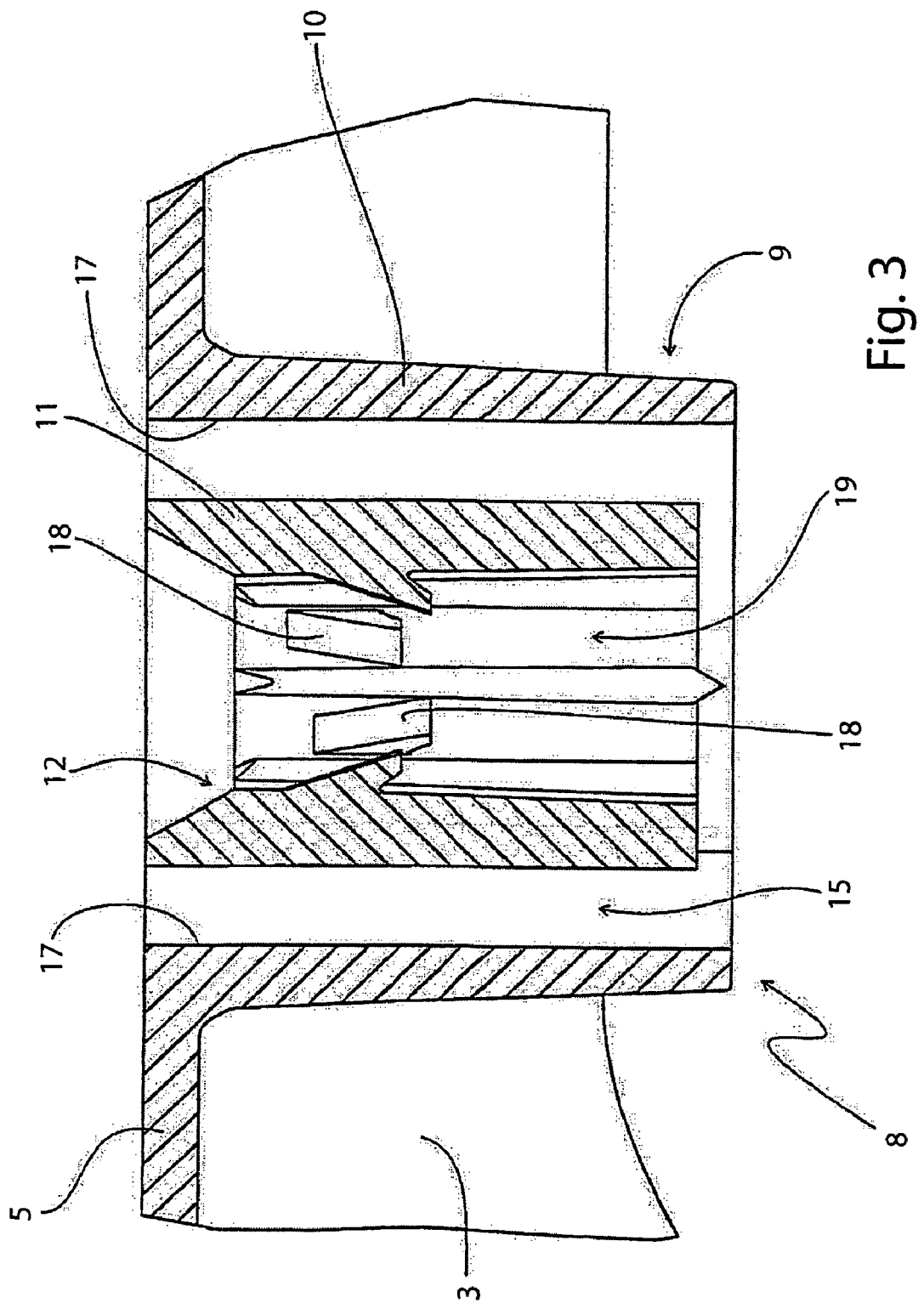

FIG. 3 shows the second connecting unit 8 according to FIG. 3 [sic] in a cross section in the longitudinal direction of the guide cavity 15. It can be seen in FIG. 3 that configured on the inside of the inner sleeve 11 are a number of latching lugs 18, which are angled towards a mounting side that is towards the top according to FIG. 3. When the second connecting unit 8 is placed on a fastening element that is configured as a threaded bolt, for example, the latching lugs 18 latch with the recesses of the fastening element that are allocated to them, and, due to the high extraction resistance, safeguard the device according to the invention against an unintentional detachment from the base part.

In addition, in FIG. 3 it is also possible to see especially clearly the space, between the transverse sections 17 of the outer sleeve 10 and the inner sleeve 11, that produces the displaceability of the inner sleeve 10 [sic] relative to the outer sleeve 12 [sic].

Finally, it can be seen in FIG. 3 that the inner sleeve 11 surrounds a continuous holding channel 19 for the largely play-free encompassing of a fastening element.

Figure 4:
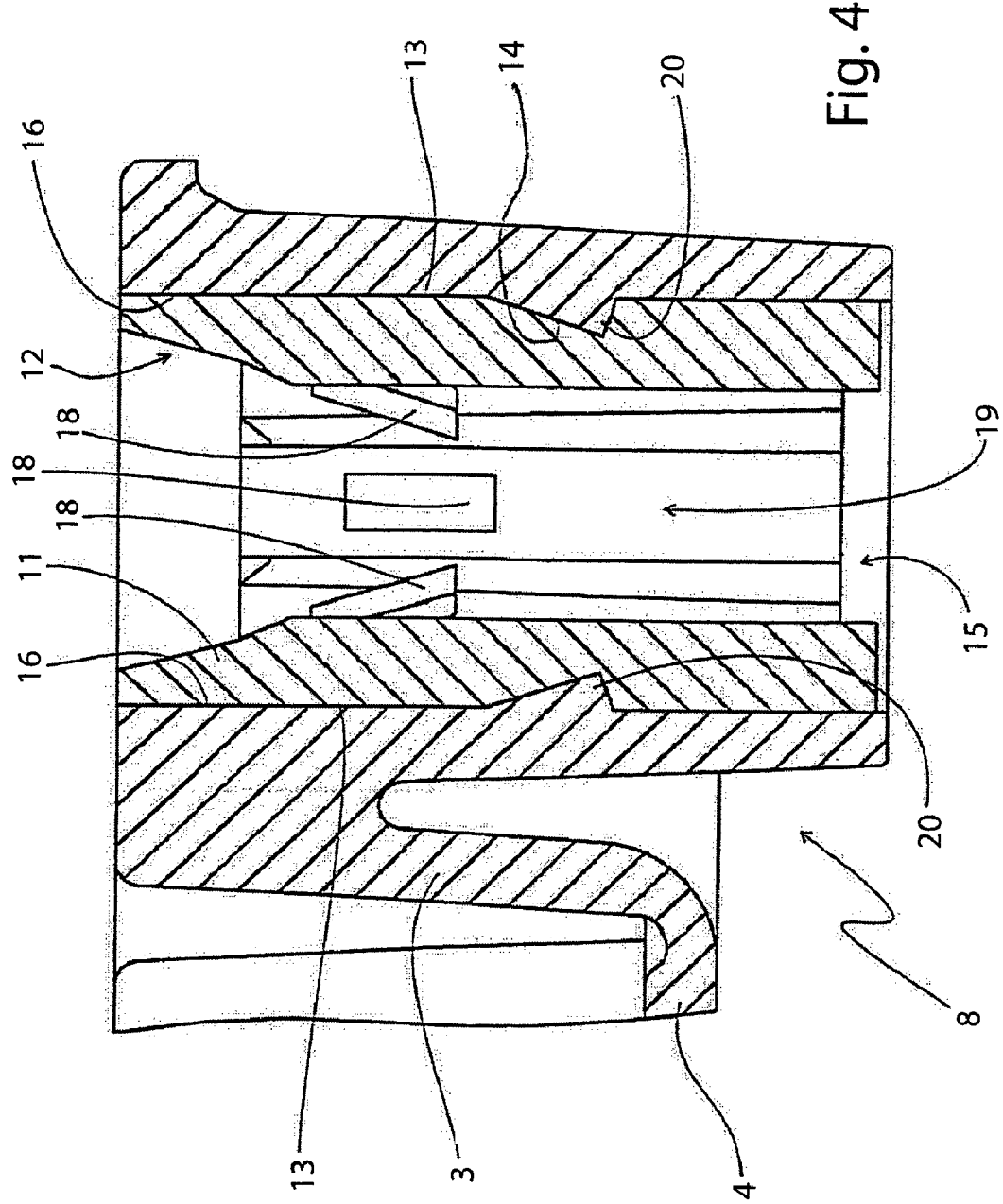

In a cross section in the transverse direction of the guide cavity 15, FIG. 4 shows the second connecting unit 8 according to FIG. 2. It can be seen in FIG. 4 that configured on the longitudinal sections 16 of the inner wall of the outer sleeve 10 are at least one engagement element, such as guide projections 20, which are configured in a manner complementary to the guide recesses 14 of the inner sleeve 11 and which engage in them. As a result, the inner sleeve 11 is safeguarded against falling out and is guided in its longitudinal displacement. In the embodiment shown, the flanks of the guide projections 20 are configured flattened towards an insertion side, towards the top in the representation according to FIG. 4, of the inner sleeve 11 in order to facilitate the insertion of same into the outer sleeve 10 and the latching with the guide projections 20.

The invention claimed is:

1. A device for fastening cable or tube to a base portion of a motor vehicle, the device comprising:
    a carrier part having an open end, a closed end capable of holding the cable or tube, and a web extending from the open end;
    a first connecting unit comprising a hollow sleeve that extends from the web;
    a second connecting unit comprising a guide part that extends from the web and a holding part releasably engageable with the guide part for connecting the carrier part to the motor vehicle base portion;
    wherein the guide part includes an outer sleeve that defines a guide cavity for receiving the holding part, the guide cavity having a cross section that is longer in a longitudinal direction than in a transverse direction, the longitudinal direction and the transverse direction being orthogonal to one another, the guide cavity including two longitudinal flat sections, at least one of the longitudinal flat sections including at least one engagement element;
    wherein the holding part includes an inner sleeve having a smaller diameter than a diameter of the outer sleeve, the inner sleeve including two outer longitudinal flat sections that correspond with the longitudinal flat sections of the guide cavity, at least one of the outer longitudinal flat sections including at least one engagement element, the inner sleeve being inserted into the outer sleeve along an axial direction orthogonal to said longitudinal and transverse directions, for connecting the carrier part to the base portion, the inner sleeve being inserted into the outer sleeve such that the at least one engagement element on the inner sleeve engages the at least one engagement element on the outer sleeve to fasten the cable or tube to the carrier part and prevent movement of the inner sleeve relative the outer sleeve in the axial and transverse directions; and wherein the inner sleeve is spaced from the outer sleeve in the longitudinal direction such that the inner sleeve is displaceable relative to the outer sleeve in the longitudinal direction when the inner sleeve is engaged with the outer sleeve.

2. The device of claim 1 wherein the at least one engagement element on the inner sleeve comprises a plurality of engagement elements and the at least one engagement element on the outer sleeve comprises a plurality of engagement elements.

3. The device of claim 2 wherein the engagement elements on the outer sleeve are formed by guide recesses that extend in the longitudinal direction and the engagement elements on the inner sleeve are formed by guide projections that extend in the longitudinal direction.

4. The device of claim 3 wherein the guide projections exhibit a triangular cross section, whereby the leading edge of the projection is more steeply angled than the trailing edge of the projection during engagement with the inner sleeve.

5. The device of claim 1 wherein the holding part surrounds a continuous holding channel and is configured with inward pointing latching lugs.

6. The device of claim 1 wherein the first connecting unit further comprises a displaceable holding part releasably engageable with the sleeve, whereby the longitudinal direction of the holding part of the first connecting unit is parallel to the longitudinal direction of the holding part of the second connecting unit.

7. The device of claim 1, wherein the holding part and guide part cooperate to adapt to positional and dimensional errors in the second connecting unit.

8. The device of claim 1, wherein the carrier part comprises a U-shaped profile for receiving the cable, the base covering the closed end to hold the cable.

9. The device of claim 1, wherein the carrier part comprises an elongated cable channel for receiving the cable.

* * * * *